United States Patent [19]

Victor

[11] 4,103,537

[45] Aug. 1, 1978

[54] MEANS AND METHOD OF HYDROSTATIC TESTING

[75] Inventor: Floyd Ray Victor, San Diego, Calif.

[73] Assignee: Rice Hydro Equipment Manufacturing, San Diego, Calif.

[21] Appl. No.: 720,902

[22] Filed: Sep. 7, 1976

[51] Int. Cl.$^2$ ............................................. G01M 3/28
[52] U.S. Cl. .................................. 73/40.5 R; 73/49.1
[58] Field of Search ................... 73/40.5, 40, 46, 49.1, 73/49.2, 49.5, 49.6

[56] References Cited

U.S. PATENT DOCUMENTS

| 2,684,590 | 7/1954 | Lassman | 73/49.6 X |
|---|---|---|---|
| 2,705,888 | 4/1955 | Sedgwick | 73/49.6 |
| 3,312,103 | 4/1967 | Goeke | 73/49.1 |
| 3,362,225 | 1/1968 | Noble | 73/49.1 |

FOREIGN PATENT DOCUMENTS 1,066,004  4/1967  United Kingdom .................... 73/49.2

Primary Examiner—Daniel M. Yasich
Attorney, Agent, or Firm—Knox & Knox

[57] ABSTRACT

A method of making an accurate quantitative measurement of leakage in water mains or the like, ordinarily at the time of installation, and the functional arrangement in a simple, easily portable assembly of a powered pump, gauge and unique valve arrangement used to carry out the test.

9 Claims, 5 Drawing Figures

MEANS AND METHOD OF HYDROSTATIC TESTING

BACKGROUND OF THE INVENTION

Wherever any great length of piping is used to carry fluids under pressure there is to be some leakage and this is particularly true of newly installed or assembled piping, such as water mains when first layed where considerable leakage is expected. Self-sealing procedures are routine, causing leakage at the joints to decrease rather quickly, but to insure reasonable integrity of the piping an inspection is ordinarily mandatory as, for example, before trenches for water mains are backfilled. The leakage is sometimes expressed in gallons per day per inch diameter and mile of pipe, but municipal inspectors may set limits on the order of two pints for a short test period in the case of approximately 1,000 feet of eight inch diameter pipe. The prescribed pressure for the test is about fifty percent in excess of the design or working pressure and the number of joints in the test section is a factor. The pipe section, in prior art systems, is isolated by closing any gates in the line and using headers or plugs so that all lateral and end openings are closed, and the pipe is filled with water and placed under pressure by a power driven water pump, or sometimes by air when no water is available. The water needed to maintain the pressure is measured, the pressure being monitored sometimes by an ordinary household meter. Measurement may also be made in terms of loss in pressure in a given time called the test period, usually that length of time required by local water department authorities, usually twenty minutes to one hour, or water is again pumped into the line to bring the pressure back to its initial value and the amount of water so pumped is measured. This measurement is often notoriously imprecise, especially perhaps when a tank is used as a source of the water. This inaccuracy arises in part from the difficulty in reading the water level in such a tank which is invariably heavy and awkward to level and necessarily large so that reading the water level may introduce appreciable error, being complicated by the meniscus effects and further complicated by the fact that the water level must be read twice, thus possibly doubling the error. In view of these facts there is a need for a simple, accurate method for such hydrostatic testing, a method which can be employed with a small portable apparatus with safety, reasonable expedition and certitude to assure convincing readings.

SUMMARY OF THE INVENTION

As claimed below, the hereinafter described invention meets the immediately above mentioned need. The method has sequential steps involving certain steps which broadly are not new in themselves, such as isolating the test section, pressurizing and making some type of measurement, but the claimed method involving repressurizing and re-enactment of the leakage with the actual fluid being bled off and measured is represented as new, and the provision made for monitoring the equipment inherent in the method as well as the means, is also new.

The claimed means is an arrangement of off-the-shelf items including a positively driven yet fully protected pump with a simple but certain operational capacity to evaluate the leakage so obviously and demonstratively that both the contractors and inspectors concerned are convincingly shown the true degree of integrity in the pipelines, a happy state of affairs not always achieved in the use of prior equipment.

In brief, the leakage is first measured in terms of pressure drop and then the test section is re-pressurized and the pressure drop duplicated by substituting bleed-off for the leakage, quickly enough that the actual concurrent leakage can be ignored, but slowly enough that the pressure fall is equalized along the test section, and accurately measuring the bled-off fluid.

DETAILED DESCRIPTION OF THE PREFERRED EMBODIMENT

Figure 1:
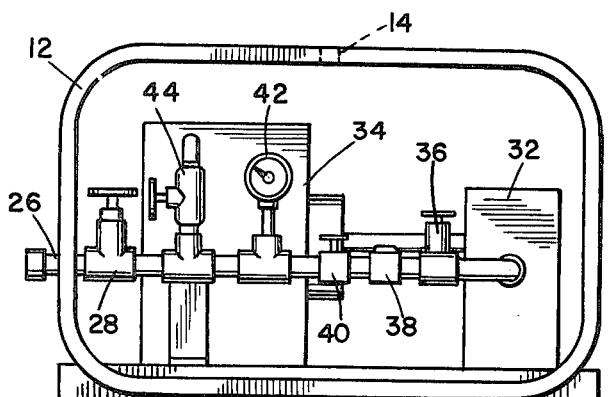
FIG. 1 is a side elevational view of the portable test apparatus.

Referring now to the drawing, in which identical numerals refer to the same or similar parts throughout the views, the apparatus includes a sturdy metal frame comprised of a base 10 and two vertical side rails 12 which function as guard rails and supports as well as hand rails, it being noted that the entire assembly is easily portable by one or two men. The side rails 12 are shown as generally rectangular with radiused corners and a top cross bar 14 extends between the side rails and further functions as a guard rail and hand rail.

Figure 2:
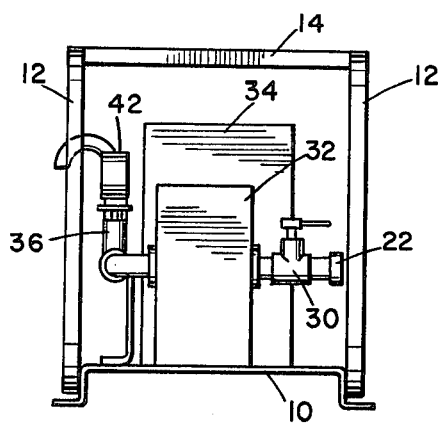
FIG. 2 is an end view of the apparatus in FIG. 1, taken from the right hand end of FIG. 1.
Figure 3:
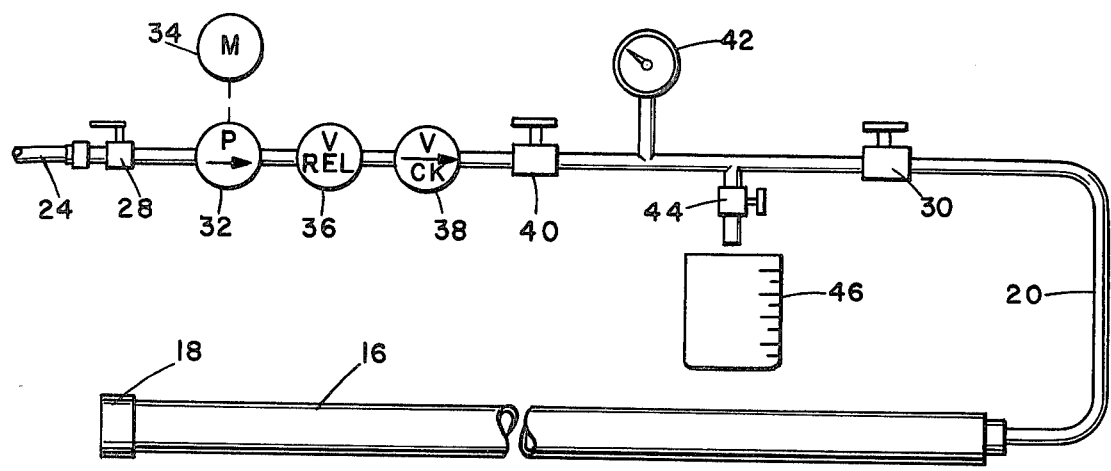
FIG. 3 is a diagrammatic representation of the apparatus and including a capped section of pipe being tested and a conduit connecting the test apparatus with the test section.
Figure 4:
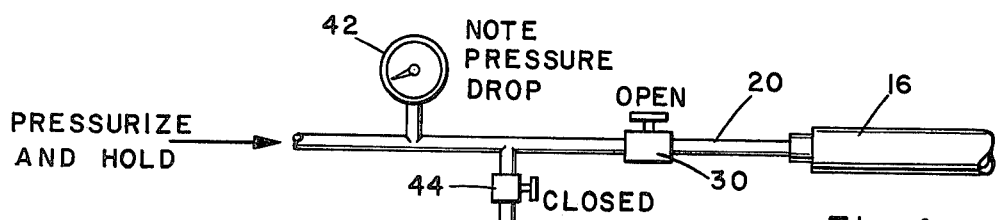
FIG. 4 is a diagram illustrating the initial steps of the method.
Figure 5:
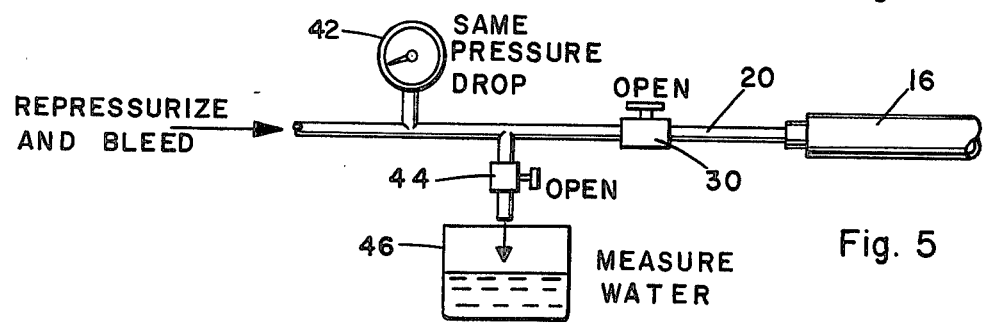
FIG. 5 is a diagram illustrating the later and final steps of the method.

The environment wherewith the apparatus of this invention is used, and wherewith the method of this invention is involved, includes a pipeline such as a water main diagrammatically illustrated in FIG. 3 and referred to herein as a test section 16 of the pipeline. This test section 16 may have joints therein and outlets of various kinds, all of which must be sealed, plugged or capped as indicated at 18, during the test period. The test section is connected with the apparatus by a conduit 20, usually a flexible high pressure hose and the hose connection is indicated at 22 in FIG. 2.

It is a feature of this invention that no tank of pressurizing fluid, ordinarily water, is required as long as there is available a local source of reasonably clean water, since the amount of water used for pressurizing, per se, is not required to be measured at any time during the test process. The source of water used will ordinarily be an adjacent prior installed water pipe and a simple hose 24 will be connected to the inlet 26 of the apparatus as indicated in FIG. 3.

An inlet valve 28 and an outlet valve 30 may be provided although these valves may be left open under ordinary conditions. The pressurizing means may vary in form within the scope of the herein claimed method, but will ordinarily be a positive displacement, water pump 32, positively driven through reduction gears by a motor 34. This pump 32 is protected by an adjustable relief valve 36 against pressure overload damage and a check valve 38 also has a secondary function in protecting the pump against backsurge pressures in the operation of the apparatus. However, the primary function of the check valve 38 is to hold the pressure on the line during the test period. The complete closing of the line against backflow toward the pump is assured, when desired, by the closing of the shut-off valve 40 and/or the above mentioned outlet valve 30.

A pressure gauge 42 measures the pressure on the line on the side of the check valve 38 remote from the pump, and a bleeder valve 44 of faucet type, also on the side of the check valve remote from the check valve 38, completes the apparatus, aside from the fluid measuring means, represented at 46, which may be a graduate or any device which enables the easy and accurate reading of the volume of water bled off in the final step of the hydrostatic test described herein.

The process or method of making a quantitative measurement, normally by volume and also normally water although the concept here embraces application to other units and fluids, is a series of steps. Most briefly stated, these steps are, first, measuring the leakage in terms of pressure drop during the test period. Then, secondly, converting this to terms of quantity of water leaked in duplicating the pressure drop by a reasonably quick, controlled bleeding with the bled-off water being measured. In greater detail, the steps are, first, connecting the pressurizing means with the test section and isolating the test section by closing all outlets such as valves, laterals and, of course, the ends of the test section 16. Then energizing the motor 34 so that the pump 32 will pressurize the test section to a degree ordinarily approximately fifty percent above the design or working pressure, as measured by the gauge 42 and held by the check valve 38 and possibly by further positive closing valves such as shut-off valve 40. Protection of the pump 32 during the testing procedure is important and this is accomplished by inserting a relief valve 36 in the line on the pressure side of the pump. This is particularly necessary if the shut-off valve 40 is closed since it is difficult to synchronize the closing with the stopping of the motor and pump.

Next, the step of preventing backflow towards the pump may be inherent in the functioning of the check valve, but it is a necessary step in the process. The original elevated pressure is noted and after the test period, usually that set by the local water authority, the reduced pressure reading, due to leakage, is noted carefully. The pump 32 is re-started; with the shut-off valve 40 opened if it had been closed, and the test section is re-pressurized to the original elevated pressure. The pump is again stopped and the shut-off valve 40 is closed if the check valve 38 is not to be wholly relied upon for any reason. Then the bleeder valve or faucet 44 is opened and water is bled off into a volumetric measuring device 46 until the above mentioned reduced pressure reading is again registered by the gauge 42. The bleeding is reasonably quickly accomplished so that the concurrent actual leakage in the test section for this very short period can be ignored in the measurement, but the bleeding should not be so rapid that equalization of pressure throughout the test section is prevented.

It will be evident that the amount of water thus measured in the measuring device 46 will be a satisfactory measurement of the original leakage during the test period.

We claim:

1. A method of quantitatively determining leakage in hydrostatic testing of pipe lines, comprising the following steps in the order named:
    (a) first measuring the leakage in terms of pressure drop, during a test period, in a test section of the pipe lines; and
    (b) converting the first measurement into terms of quantity of fluid loss by repressurizing the test section and then achieving an identical pressure drop by a reasonably quick, controlled bleeding of the test section collected into a measuring means to duplicate the leakage, and measuring the amount of bled-off fluid.

2. A method of quantitatively determining leakage in hydrostatic testing of pipelines, particularly water mains and the like, said method comprising the following steps substantially in the order named:
    (a) isolating a test section of the pipeline by closing any valves and laterals of the section and the ends thereof while retaining functional connection with a pressurizing means;
    (b) using pressurizing means to force water into the test section, and using a pressure gauge, to generate an accurately measured elevated pressure equal to at least a prescribed test pressure during a test period;
    (c) for the test period, depressurizing the pressurizing means while closing the pressurized test section against backflow to the pressurizing means;
    (d) noting the reduced pressure at the end of the test period;
    (e) repressurizing the test section to exactly said elevated pressure;
    (f) again depressurizing the pressurizing means while closing the pressurized test section against backflow to the pressurizing means; and
    (g) finally promptly bleeding water from the re-pressurized section to lower pressure to said reduced pressure, and quantitatively measuring the bled-off fluid.

3. A method of quantitatively determining leakage in hydrostatic testing of pipelines according to claim 2 wherein the final step of bleeding and measuring is done reasonably quickly so that concurrent leakage can be ignored, but slowly enough to allow pressure equalization throughout the test section and thus to give a truer measurement.

4. A method of quantitatively determining leakage in hydrostatic testing of pipelines according to claim 2, wherein the pressurizing means is a pump and the step 1 (c) of de-activating the pressurizing means while closing the test section is accomplished by stopping the pump with simultaneous automatic action by an automatic check valve and substantially simultaneous hand closing of a shut-off valve, with a relief valve provided to protect the pump if the hand operations of de-activating the pump and closing the shut-off valve are not perfectly coordinated.

5. Means for quantitatively determining leakage in hydrostatic testing of pipelines, particularly isolated sections of water mains and the like, comprising:
    (a) controllable pressurizing means connectable to a source of fluid and having an outlet conduit connectable to a section of isolated pipe to be tested;
    (b) pressure-measuring means operatively connected to said conduit;
    (c) backflow-preventing means operatively connected in said conduit between said pressurizing means and said pressure-measuring means;
    (d) bleeder means operatively connected to bleed fluid from said conduit after said section has been repressurized on the side of said backflow preventing means remote from said pressurizing means; and (e) metering means operatively coacting with said bleeder means to to collect and to measure the fluid bled off from said section of pipe.

6. Means according to claim 5 wherein said pressurizing means is a positive drive, positive-displacement water pump and the fluid pumped is water.

7. Means according to claim 5 wherein said pressure—measuring means is a water-pressure gauge and the fluid used is water.

8. Means according to claim 5 wherein said backflow—preventing means is a check valve.

9. Means according to claim 5 wherein said pressurizing means is a pump, said backflow-preventing means is a check valve and a shut-off valve, with a relief valve between the shut-off valve and the pump.

* * * * *